(12) United States Patent
Liebart

(10) Patent No.: US 8,912,791 B2
(45) Date of Patent: Dec. 16, 2014

(54) MAGNETIC SENSOR FOR DETERMINING THE POSITION AND ORIENTATION OF A TARGET

(75) Inventor: Vincent Liebart, Lyons (FR)

(73) Assignee: Electricfil Automotive, Miribel Cedex (FR)

( * ) Notice: Subject to any disclaimer, the term of this patent is extended or adjusted under 35 U.S.C. 154(b) by 429 days.

(21) Appl. No.: 13/502,204

(22) PCT Filed: Oct. 13, 2010

(86) PCT No.: PCT/FR2010/052175
§ 371 (c)(1),
(2), (4) Date: Jun. 14, 2012

(87) PCT Pub. No.: WO2011/045540
PCT Pub. Date: Apr. 21, 2011

(65) Prior Publication Data
US 2012/0262157 A1 Oct. 18, 2012

(30) Foreign Application Priority Data
Oct. 14, 2009 (FR) ...................... 09 57189

(51) Int. Cl.
*G01B 7/30* (2006.01)
*G01B 7/15* (2006.01)
*G01D 5/14* (2006.01)
(52) U.S. Cl.
CPC ..................... *G01D 5/145* (2013.01)

USPC ............... 324/207.2; 324/207.25; 324/207.23
(58) Field of Classification Search
USPC ............... 324/207.2, 207.21, 207.25, 207.23
See application file for complete search history.

(56) References Cited

U.S. PATENT DOCUMENTS

| | | | |
|---|---|---|---|
| 6,573,709 B1 | 6/2003 | Gandel et al. | |
| 8,587,294 B2 * | 11/2013 | Masson et al. | ........... 324/207.24 |
| 2007/0126418 A1 | 6/2007 | Dufour et al. | |

FOREIGN PATENT DOCUMENTS

FR    2 829 574    3/2003

\* cited by examiner

*Primary Examiner* — Jay Patidar
(74) *Attorney, Agent, or Firm* — Ladas & Parry LLP

(57) ABSTRACT

The invention relates to a magnetic sensor for determining the position of a part (2) movable firstly in rotation over a limited angular stroke by virtue of a rotary movement (R), and secondly in translation along a translation axis (X) and over a limited linear stroke, this sensor including both a magnetized target (3) mounted on and fastened to the movable part (2) and taking the form of a radially-magnetized part-cylinder having an axis of symmetry coinciding with the translation axis (X) and also a system (5) for measuring the magnetic field of the magnetized target to determine the position of the target in three dimensions. According to the invention, in order to determine the position and the orientation of the target, the system (5) acts at a single point to measure the direction of the magnetic field in two orthogonal planes, one of which ($P_1$) is normal to the rotary movement (R) and the other of which ($P_2$) is normal to the movement in translation (X).

10 Claims, 3 Drawing Sheets

MAGNETIC SENSOR FOR DETERMINING THE POSITION AND ORIENTATION OF A TARGET

This application is a 371 of PCT/FR2010/052175, filed on Oct. 13, 2010, which claims priority to French patent application number 09 57189, filed Oct. 14, 2009, which is incorporated herein by reference.

The present invention relates to the technical field of contactless magnetic sensors adapted to determine the position of a movable part moving along a particular trajectory combining a linear movement and a rotary movement.

The invention finds a particularly advantageous, but nonexclusive, application in the field of motor vehicles for equipping various members of limited linear and rotary movement and of position that needs to be known.

The invention finds a particularly advantageous application in the technical field of position sensors for the gearbox of a motor vehicle.

In the prior art, there is known from patent application FR 2 904 394, for example, a position sensor for a gearbox of a motor vehicle including a magnetized target intended to be fastened to the gear-change actuator rod of a gearbox. That actuator rod is movable in rotation and in translation and is moved as a function of the movements of the gear-change stick. That sensor also includes a Hall-effect component adapted to measure magnetic field in three orthogonal directions to determine both the position and the orientation of the target in space with a view to deducing therefrom the position of the gear-change stick.

A drawback of the above magnetic sensor relates to its lack of accuracy, given the difficulty of obtaining a reliable measurement throughout the rotary movement of the target whatever its movement in translation, and throughout the movement in translation whatever its rotary rotation. Moreover, the measurement obtained is very sensitive to variation of the air gap, i.e. to variation of the distance between the target and the Hall-effect measuring component.

Patent FR 2 786 266 describes a sensor for determining the position of a part that is movable in translation and in rotation. According to one feature, such a sensor includes a radially magnetized half-ring movable between two inner ferromagnetic stators and two outer ferromagnetic stators. The two inner stators are half-moon-shaped and define between them a first air gap and the two outer stators are in the form of rings and define a second air gap. A Hall-effect probe is mounted in each of these air gaps. When the magnetized ring is moved in rotation and in translation, it generates a variation in magnetic field in each of the two secondary air gaps. Such a sensor is able to determine the position of a part as a function of the amplitude of the magnetic field measured by the two Hall-effect probes. Such a sensor requires the use of a plurality of ferromagnetic parts, leading to overall size constraints. Moreover, the accuracy of such a sensor is related to the correct positioning of the probes.

In a similar way, Patent FR 2 829 574 describes a sensor for determining the position of an article that is movable in translation and in rotation. Such a sensor includes a cylindrical magnet engaged inside a coaxial cylindrical field assembly defining two magnetic circuits, each defining an air gap in which there is placed a sensor that is sensitive to the amplitude of the magnetic field. Such a sensor is able to determine the axial and angular relative positions of the magnetic field assembly and of the magnet as a function of the amplitude of the magnetic field measured by the sensors placed in the air gaps. The use of a ferromagnetic field assembly leads to overall size constraints for the production of such a position sensor. Moreover, the position sensor has a drawback linked to its lack of accuracy relative to the correct positioning of the probes.

The present invention therefore aims to remedy the drawbacks of the prior art by proposing a new magnetic sensor able to determine the position of a part that is movable linearly and in rotation, with high accuracy throughout its travel, even for a relatively large variation of the measurement air gap.

To achieve such an object, the invention provides a magnetic sensor for determining the position of a part that is movable firstly in rotation over a limited angular stroke by virtue of a rotary movement, and secondly in translation along a translation axis and over a limited linear stroke, this sensor including both a magnetized target mounted on and fastened to the movable part and taking the form of a radially-magnetized part-cylinder having an axis of symmetry coinciding with the translation axis and also a system for measuring the magnetic field of the magnetized target to determine the position of the target in three dimensions.

According to the invention, in order to determine the position and the orientation of the target, the system acts at a single point to measure the direction of the magnetic field in two orthogonal planes, one of which is normal to the rotary movement and the other of which is normal to the movement in translation.

The invention also relates to magnetic sensor having one or more of the following features:
- the measuring system processes a measuring signal proportional to the direction of the magnetic field in the plane normal to the rotary movement and a measuring signal proportional to the direction of the magnetic field in the plane normal to the movement in translation;
- the measuring system includes measuring means sensitive to the direction of the magnetic field;
- the measuring system includes Hall-effect cells sensitive to the components of the magnetic field along three mutually-orthogonal axes;
- the measuring system includes a stage for processing measurement signals proportional to the orientation of the magnetic field in the planes normal to the rotary movement and to the movement in translation, in such a manner as to deliver signals corresponding to the position and to the orientation of the target;
- the measuring system includes a stage for quantizing the signals corresponding to the position and to the orientation of the target in order to deliver a binary signal;
- the part-cylinder is magnetized radially from one end to the other;
- the part-cylinder is magnetized radially in its central portion and in a varying direction tending towards a circumferential direction at the ends of said portion;
- the magnetized target is mounted on and fastened to a movable part in the form of a gear-change actuator rod.

The invention further provides a gearbox including a gear change actuator rod that is movable in rotation and in translation over limited strokes and that includes a magnetic sensor of the invention.

Various other features emerge from the description given below with reference to the appended drawings that show embodiments of the invention by way of non-limiting example.

Figure 1:
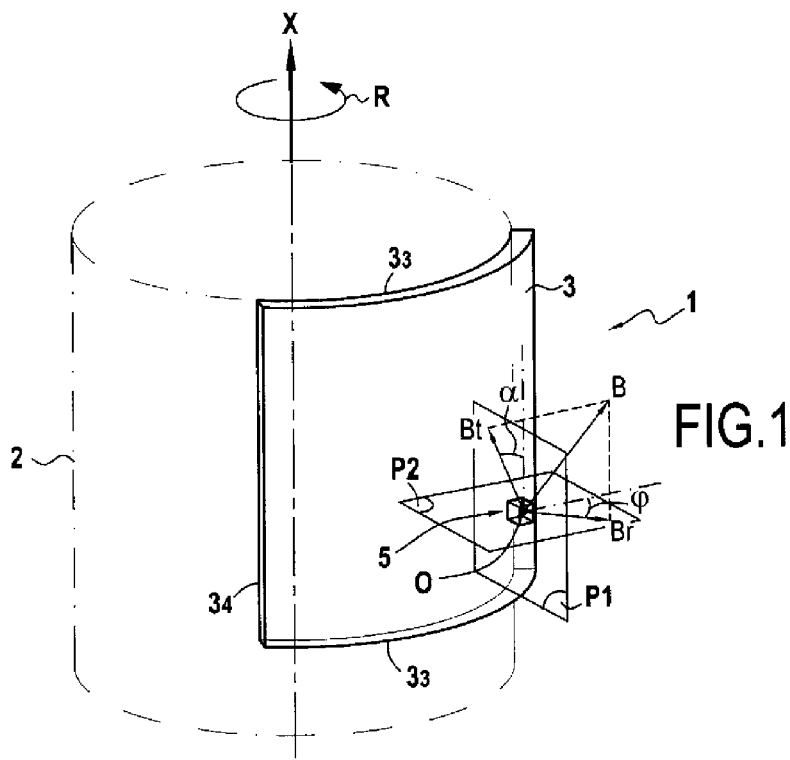
FIG. 1 is a diagrammatic perspective view showing the magnetic sensor of one embodiment of the invention.
Figure 2:
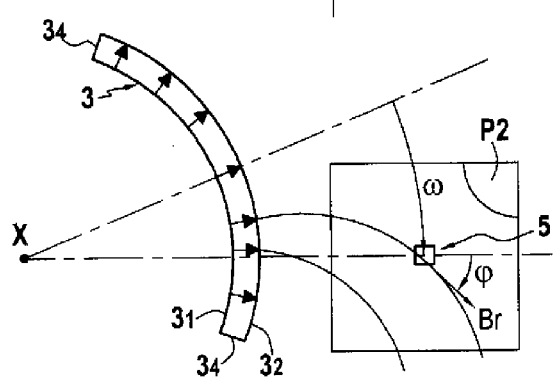
FIG. 2 is a view from above of the magnetic sensor of the invention.
Figure 3:
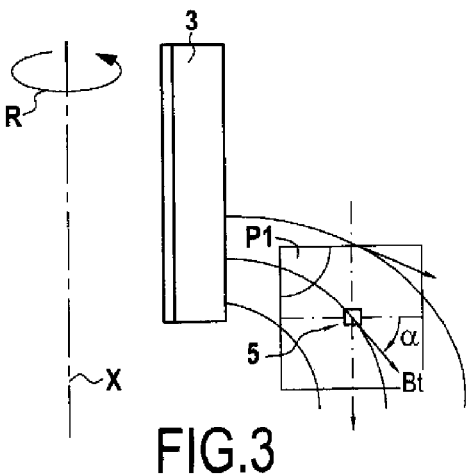
FIG. 3 is a view in elevation of the magnetic sensor of the invention.

As shown more precisely in FIGS. 1 to 3, the invention relates to a magnetic sensor 1 adapted to determine the position of a part 2 that is movable in the general sense both in translation along a translation axis X and in rotation about the translation axis X. The sensor 1 includes a magnetized target 3 mounted on and fastened by any appropriate means to the movable part 2. The magnetic sensor 1 also includes a system 5 for measuring the direction of the magnetic field B of the magnetized target 3 in order to determine the position and the orientation of the magnetized target 3 in three dimensions. The measuring system 5 is stationary, in contrast to the movable magnetized target 3.

The magnetic sensor 1 is thus adapted to determine the position of the magnetized target 3 and consequently of the part 2, the magnetized target 3 and the part 2 being movable both in rotation over a limited angular stroke $\omega$ by virtue of a turning movement R about the translation axis X and also in translation along the translation axis X and over a limited linear stroke x.

According to the invention, the magnetized target 3 is a part-cylinder with an axis of symmetry coinciding with the translation axis X. The magnetized target 3 is thus defined by an inner face $3_1$ and an outer face $3_2$ parallel to each other and each having its curvature centered on the translation axis X. The faces $3_1$, $3_2$ are defined by peripheral edges $3_3$, $3_4$. The magnetized target 3 has a thickness of the order of a few millimeters (mm), for example, and subtends an angle depending on the variation to be measured in the angle of rotation. For example, this angular range may lie in the range 40° to 110°. In the example shown, the magnetized target 3 has opposite edges $3_3$ in planes parallel to each other and perpendicular to the translation axis X and also opposite peripheral edges $3_4$ extending lengthwise in directions parallel to each other and to the translation axis X. In this example, the projection of the magnetized target 3 is inscribed within a rectangle. Of course, the magnetized target 3 may have a different shape, as a function of the trajectory of the part 2 to be detected.

Figure 4:
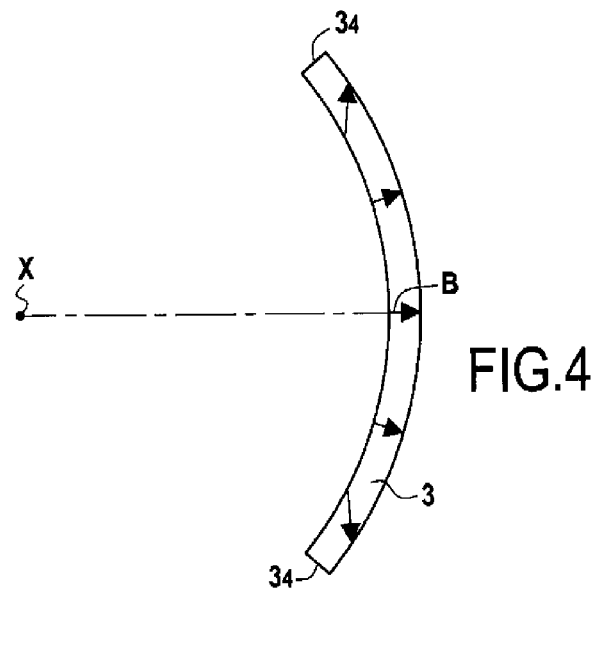
FIG. 4 is a diagrammatic view of another example of a magnetized target of the invention.

According to one feature of the invention, the magnetized target 3 is magnetized radially, i.e. the magnetic axis is oriented in a radial direction perpendicular to the movement axis X and passing through the movement axis X (FIG. 2). In a first embodiment shown in FIG. 2, the magnetized target 3 is magnetized radially from one peripheral edge $3_4$ to the other. In other words, the magnetic axis of the magnetized target 3 passes through the movement axis X throughout the angular measurement of the part-cylinder. In another embodiment shown in FIG. 4, the magnetized target 3 is magnetized radially in its central part as described above and in a varying direction tending towards a circumferential direction at the peripheral edges $3_4$. The magnetic axis of the magnetized target 3 thus has a direction that varies gradually starting from a radial direction in the central portion of the magnetized target 3 and approaching circumferential magnetization towards the peripheral edges $3_4$.

According to another feature of the invention, in order to determine the position and the orientation of the movable target 2, the system 5 acts at a single point to measure the direction of the magnetic field B in two orthogonal planes, one of which $P_1$ is normal to the rotary movement R and the other of which $P_2$ is normal to the movement in translation X. In other words, the so-called translation plane $P_1$ is therefore parallel to the movement axis X, being perpendicular to the rotary movement R, and the so-called rotation plane $P_2$ is perpendicular to the movement axis X.

The measuring system 5 thus enables the direction a of the magnetic field to be measured in the translation plane $P_1$ and the direction $\phi$ of the magnetic field to be measured in the rotation plane $P_2$. The magnetic field B delivered by the movable target 3 includes a component Bt in the translation plane $P_1$ and a component Br in the rotation plane $P_2$. As is clear from FIG. 1, the components Br and Bt lie in the rotation plane $P_2$ and the translation plane $P_1$, respectively, which components have a common origin point O.

Figures 6A, 6B, 6C:
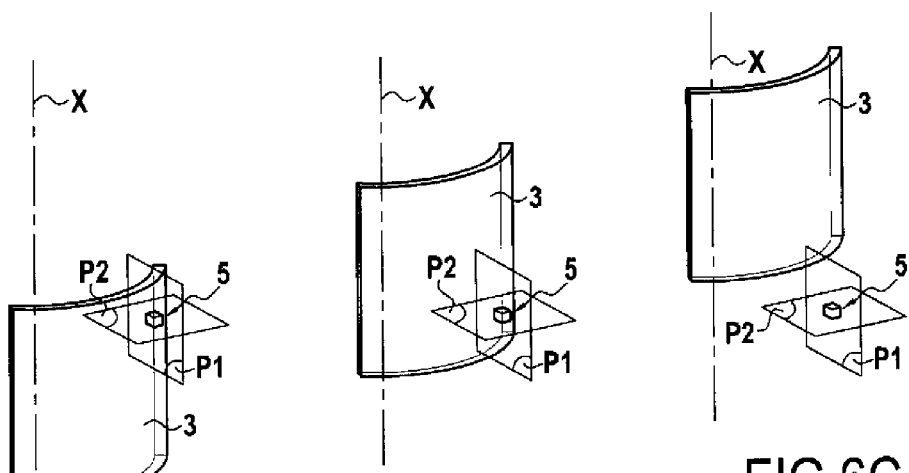
FIGS. 6A to 6C are views showing the position sensor in three rotary positions in the absence of movement in translation.
Figure 7A:
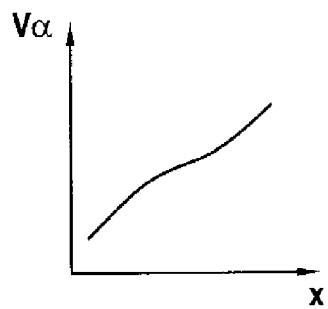
FIGS. 7A and 7B are curves of the signals measuring the direction a of the magnetic field and the direction St of the movement in translation as a function of the movement in translation x of the magnetized target.

Accordingly, as is seen more clearly in FIG. 3, the measuring system 5 is able to measure the direction a of the component Bt of the magnetic field which varies as a function of the position in translation of the movable target 3 relative to the measuring system 5 (FIG. 3). Measuring at the origin point O of the direction of the component Bt of the field in the plane $P_1$ normal to the rotation R enables the position of the magnetized target 3 to be detected. FIGS. 6A to 6C show the travel of the magnetized target 3 during a movement in translation x, along the movement axis X, in the absence of rotation. Since the variation of the angle $\alpha$ is monotonic, the measurement signal $V\alpha$ is also monotonic (FIG. 7A).

Figure 8A:
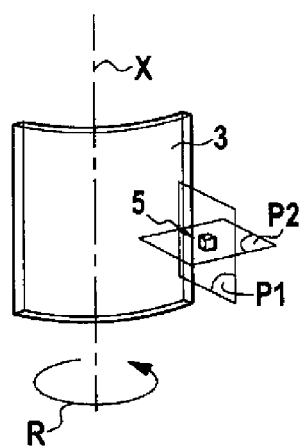
FIGS. 8A to 8C show the position sensor in three positions in translation in the absence of rotation.
Figure 8B:
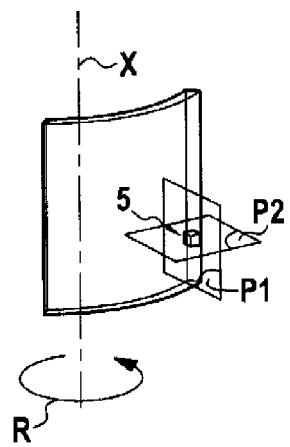
Figure 8C:
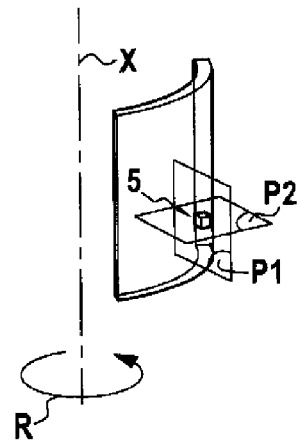
Figure 9A:
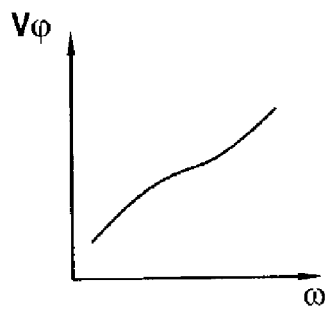
FIGS. 9A and 9B are curves showing the signals $V\phi$ measuring the direction of the magnetic field and the direction Sr of the rotation as a function of the rotation $\omega$ of the magnetized target.

Similarly, the measuring system 5 is able to measure the direction $\phi$ of the component Br of the magnetic field that varies as a function of the position in rotation of the movable target 3 relative to the measuring system 5 (FIG. 2). Measuring at the origin point O the direction of the component Br of the field in the plane $P_2$ normal to the movement in translation x enables the orientation of the magnetized target 3 to be detected. FIGS. 8A to 8C show the travel of the magnetized target 3 during its rotation $\omega$ by virtue of the rotary movement R in the absence of translation. Since the variation of the angle $\phi$ is monotonic, the measurement signal $V\phi$ is also monotonic (FIG. 9A).

Figure 5:
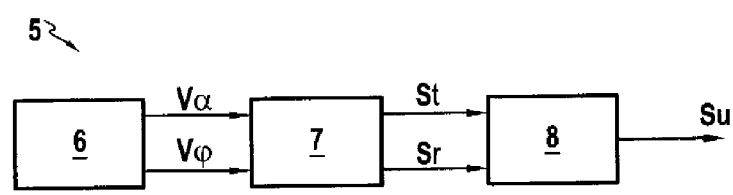
FIG. 5 is a functional block diagram of the measuring system of the magnetic sensor of the invention.

As is clear from FIG. 5, the measuring system 5 includes measuring means 6 that may be directly sensitive to the direction of the magnetic field or else it may reconstitute the signals $V\alpha$, $V\phi$ that are proportional to the angles $\alpha$, $\phi$ characterizing the direction of the magnetic field in the planes $P_1$ and $P_2$, respectively. For example, measuring the components of the field along the three axes x, y, z of the system of axes linked to the measuring system 5 using a Hall-effect technology enables these angles $\alpha$, $\phi$ to be determined.

It should be noted that the measuring system 5 measures the direction of the magnetic field B concerned at a single point in three dimensions, without using stator elements aiming to guide the magnetic flux in the measuring system. In other words, the measuring system 5 directly measures the natural direction of the magnetic field created by the magnetized target 3. Measuring the direction of the magnetic field at a single measurement point without using pole pieces is favorable to integrating such a sensor within a limited overall size.

Figure 7B:
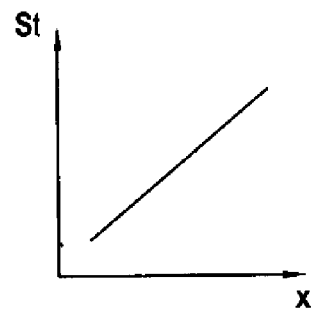
Figure 9B:
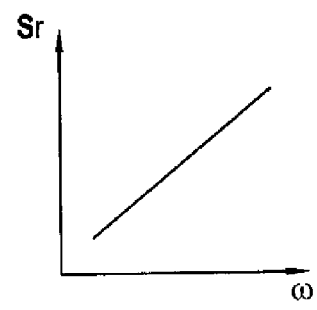

The signals Vα, Vφ delivered by the measuring means 6 are processed by an electrical gain stage 7 to produce two linear signals St, Sr (FIGS. 7B, 9B) that reflect the movements of the movable target 3 respectively in translation x and in rotation ω. It should be noted that the movement in translation x has very little influence on the signal Sr reflecting the rotary movement R. Reciprocally, the rotary movement R has very little influence on the signal St reflecting the movement in translation. The magnetic sensor of the invention constitutes a robust sensor combining movements in rotation R and in translation x. In practice such a sensor is found to be relatively insensitive to variations of the distance between the measuring system 5 and the magnetized target 3, since the system 5 measures the direction of the magnetic field that does not vary much as a function of variations of the distance between the measuring system 5 and the magnetized target 3.

In a different embodiment, the measuring system 5 includes a stage 8 for quantizing the signals St, Sr delivered by the stage 7. This embodiment delivers a unique signal Su that is a combination of the signals St, Sr and corresponds to a binary signal.

The magnetic sensor 1 finds a particularly advantageous, but non-exclusive, application to the gearbox of a motor vehicle. To this end, the magnetized target 3 is fixed to or provided on the rod for actuating gear changes of a gearbox. The magnetic sensor 1 of the invention thus makes it possible to determine the position of the gear-change stick, where movements of the stick correspond to movements in rotation and in translation of the rod under the control of the stick.

The invention is not limited to the examples described and shown, since various modifications may be made thereto without departing from the ambit of the invention.

The invention claimed is:

1. A magnetic sensor for determining the position of a part (2) movable firstly in rotation over a limited angular stroke (ω) by virtue of a rotary movement (R), and secondly in translation along a translation axis (X) and over a limited linear stroke (x), this sensor including both a magnetized target (3) mounted on and fastened to the movable part (2) and taking the form of a radially-magnetized part-cylinder having an axis of symmetry coinciding with the translation axis (X) and also a system (5) for measuring the magnetic field of the magnetized target to determine the position of the target in three dimensions, the sensor being characterized in that, in order to determine the position and the orientation of the target, the system (5) acts at a single point to measure the direction of the magnetic field in two orthogonal planes, one of which ($P_1$) is normal to the rotary movement (R) and the other of which ($P_2$) is normal to the movement in translation (X).

2. A magnetic sensor according to claim 1, characterized in that the measuring system (5) processes a measuring signal (Vα) proportional to the direction of the magnetic field in the plane ($P_1$) normal to the rotary movement (R) and a measuring signal (Vφ) proportional to the direction of the magnetic field in the plane ($P_2$) normal to the movement in translation (X).

3. A magnetic sensor according to claim 2, characterized in that the measuring system (5) includes measuring means (6) sensitive to the direction of the magnetic field.

4. A magnetic sensor according to claim 2, characterized in that the measuring system (5) includes Hall-effect cells sensitive to the components of the magnetic field along three mutually-orthogonal axes.

5. A magnetic sensor according to claim 1, characterized in that the measuring system (5) includes a stage (7) for processing measurement signals (Vα, Vφ) proportional to the orientation of the magnetic field in the planes normal to the rotary movement (R) and to the movement in translation (X), in such a manner as to deliver signals (St, Sr) corresponding to the position and to the orientation of the target.

6. A magnetic sensor according to claim 5, characterized in that the measuring system (5) includes a stage (8) for quantizing the signals corresponding to the position and to the orientation of the target in order to deliver a binary signal.

7. A magnetic sensor according to claim 1, characterized in that the part-cylinder is magnetized radially from one end ($3_4$) to the other ($3_4$).

8. A magnetic sensor according to claim 1, characterized in that the part-cylinder is magnetized radially in its central portion and in an evolving direction tending toward a circumferential direction at the ends of said portion.

9. A magnetic sensor according to claim 1, characterized in that the magnetized target (3) is mounted on and fastened to a movable part in the form of a gear change actuator rod.

10. A gearbox including a gear change actuator rod that is movable in rotation and in translation over limited strokes, the gearbox being characterized in that it includes a magnetic sensor (1) according to claim 1.

* * * * *